United States Patent [19]

Pedrono

[11] Patent Number: 5,270,745
[45] Date of Patent: Dec. 14, 1993

[54] PROGRESSIVE MULTIFOCAL OPHTHALMIC LENS

[75] Inventor: Claude Pedrono, Briis-sous-Forges, France

[73] Assignee: Essilor International (Compagnie Generale d'Optique), Creteil Cedex, France

[21] Appl. No.: 967,719

[22] Filed: Oct. 28, 1992

[30] Foreign Application Priority Data

Nov. 12, 1991 [FR] France ............................. 91 13873

[51] Int. Cl.$^5$ ............................................. G02C 7/06
[52] U.S. Cl. ..................................... 351/169; 351/177
[58] Field of Search ............... 351/168, 169, 170, 171, 351/172

[56] References Cited

U.S. PATENT DOCUMENTS

| | | | |
|---|---|---|---|
| 3,687,528 | 8/1972 | Maitenaz | 351/169 |
| 3,910,691 | 10/1975 | Maitenaz | 351/169 |
| 4,315,673 | 2/1982 | Guilino et al. | 351/169 |
| 4,606,622 | 8/1986 | Fueter | 351/169 |
| 4,676,610 | 6/1987 | Barkan et al. | 351/169 |
| 4,778,266 | 10/1986 | Maitenaz | 351/169 |
| 4,786,160 | 11/1988 | Furter | 351/169 |
| 4,838,674 | 6/1989 | Dufour | 351/169 |

FOREIGN PATENT DOCUMENTS

| | | |
|---|---|---|
| 0301917 | 2/1989 | European Pat. Off. |
| 2100877 | 1/1983 | United Kingdom |
| 2130391 | 5/1984 | United Kingdom |
| 2206978 | 1/1989 | United Kingdom |

Primary Examiner—Scott J. Sugarman

[57] ABSTRACT

The lens has an aspherical surface having a zone for far vision, a zone for near vision, and between these two zones, a zone for intermediate vision, with a meridian curve along which the curvature of the surface varies progressively and which is inclined from top to bottom towards the nose side of the lens, at least in the intermediate zone. A portion of the meridian curve situated in the intermediate and near zones is divided into a first segment at an angle $\alpha$ to the vertical where the value of $\alpha$ is an increasing function of the power addition A of the lens, and a second segment at an angle $\omega$ to the vertical where $\omega$ is smaller than $\alpha$. At the point where the two segments meet, the mean sphere value of the surface corresponds to a power addition lying in the range 0.8 to 0.92 times the nominal power addition of the lens.

15 Claims, 5 Drawing Sheets

PROGRESSIVE MULTIFOCAL OPHTHALMIC LENS

The present invention relates to a multifocal ophthalmic lens comprising an aspherical surface having a first vision zone for far vision, a second vision zone for near vision, and between said first and second zones, a third vision zone for intermediate vision with the curvature thereof varying progressively along a main meridian curve of power progression that extends from the top edge to the bottom edge of the lens and that passes successively through all three vision zones of the aspherical surface, passing through three predetermined points thereof, namely a first point situated in the first vision zone and called the far vision power measurement point where the aspherical surface has a first predetermined mean sphere value, a second point called the mounting center and situated between the first point and the geometrical center of the aspherical surface, and a third point situated in the second vision zone and called the near vision power measurement point where the aspherical surface has a second predetermined mean sphere value, the difference between the first and second mean sphere values being equal to the power addition of the lens, the main meridian curve having a shape that depends on the value of the power addition and that in a front view of the aspherical surface includes a first portion extending vertically from the top edge of the lens to the second point, and a second portion extending obliquely from the second point towards the nose side of the lens.

BACKGROUND OF THE INVENTION

Multifocal ophthalmic lenses are now well known. They are commonly used for correcting presbyopia, while allowing the wearer of glasses to observe objects over a wide range of distances without having to remove the glasses in order to view distant objects. Manufacturers of multifocal ophthalmic lenses usually manufacture a family of semi-finished lenses i.e., initially, only that surface of the lenses in the family which includes the three above-mentioned vision zones is machined, while the other surface of the lenses in the family is machined subsequently to a spherical or toroidal shape with curvature appropriate for each wearer of glasses, depending on an ophthalmological prescription. In a given family of lenses, power addition varies gradually from one lens to another in the family between a value of minimum addition and a value of maximum addition. The minimum and maximum addition values are usually respectively 0.5 diopters and 3.5 diopters, and the addition varies in steps of 0.25 diopters from one lens to another in the family. Under such circumstances a family of lenses comprises thirteen lenses.

Of the multifocal ophthalmic lenses that are commercially available, there are two main families of lenses. In the first family of lenses, the progression length, i.e. the distance between the first and third above-mentioned points of the progression main meridian curve is constant and the gradient of the optical power varies from one lens to another in said first family (French patent Nc. 2 058 499 and its two certificates of addition Nos. 2 079 663 and 2 193 989).

In the second family of lenses, the optical power gradient along the progression main meridian curve is constant and identical for all the lenses of said second family, regardless of their power addition (Japanese patent No. 54-85743).

It is well known, that regardless of the family to which they belong, multifocal ophthalmic lenses inevitably present optical aberrations (astigmatism, distortion, field curvature, etc.) that reduce comfort of vision, both in static vision and in dynamic vision. In addition, when the presbyopia of a person increases, requiring the use of lenses having greater power addition, changing to lenses having greater power addition usually requires a physiological adaptation effort on the part of the wearer of the glasses. The adaptation time may be one to several days depending on the subject.

In the past, the efforts of multifocal ophthalmic lens manufacturers have been directed mainly on improving comfort of vision.

Over the last few years, the Applicant has proposed a third family of ophthalmic lenses tending to resolve the problem of reducing physiological adaptation effort and adaptation time when changing from a pair of glasses having a first value of power addition to a pair of glasses having a second, greater value of addition (French patent No. 2 617 989).

It is now desired to satisfy even better the vision needs of people suffering from presbyopia by taking account, in particular, of their posture and of their habits, and also the shortening of distance to the work surface (reduction in the near vision distance) that is observed with increasing age of the subject.

An object of the present invention is thus to provide a multifocal ophthalmic lens, or more precisely a family of lenses, that takes account of the preferred up and down position of the eyes in the ocular orbit, which position itself depends on the viewing distance and on the inclination of the head in the sagittal plane (the vertical plane passing through the middle of the line segment joining the centers of rotation of the two eyes, and perpendicular thereto), and also taking account of the changes (reduction) in the near viewing distance with increasing age of the subject.

SUMMARY OF THE INVENTION

The Applicant has discovered that this object can be achieved in a lens of the above-defined type by the fact that the second portion of the main meridian curve includes a first segment which extends from the mounting center to a fourth point situated above the third point generally in a first direction at a first angle c of predetermined value relative to the vertical first portion of the main meridian curve, which predetermined value depends on the power addition A in accordance with an increasing function $\alpha = f(A)$, and a second segment which extends from the fourth point to the third point generally in a second direction at a second angle $\omega$ relative to the vertical first portion of the main meridian curve, the second angle $\omega$ having a predetermined value such that $0 < \omega < \alpha$, and by the fact that the aspherical surface has a predetermined mean sphere value $S_C$ at the fourth point which is equal to:

$$S_C = S_L + k \cdot A$$

where $S_L$ is said first predetermined mean sphere value at the first point, A is the power addition, and k is a coefficient such that:

$$0.8 < k < 0.92.$$

Tests performed on a representative sample of people have shown that wearers fitted with lenses of the invention mark a very clear preference for said lenses.

Preferably, the predetermined value of the second angle ω depends on the power addition A, in accordance with an increasing function ω=g(A) thereof. Similarly, the coefficient k has a value that depends on the power addition A, in accordance with a decreasing function k=i(A) thereof. Finally, in a system of coordinates where the abscissa axis corresponds to the horizontal diameter of the lens that is circular in shape when seen from in front, and where the ordinate axis corresponds to the vertical diameter of said lens, the ordinate and the abscissa of said fourth point and the abscissa of said third point have predetermined values that depend on the power addition A, in compliance with respective increasing functions thereof, as explained below.

BRIEF DESCRIPTION OF THE DRAWINGS

Embodiments of the invention are described by way of example with reference to the accompanying drawings, in which.

DETAILED DESCRIPTION

Figure 1:
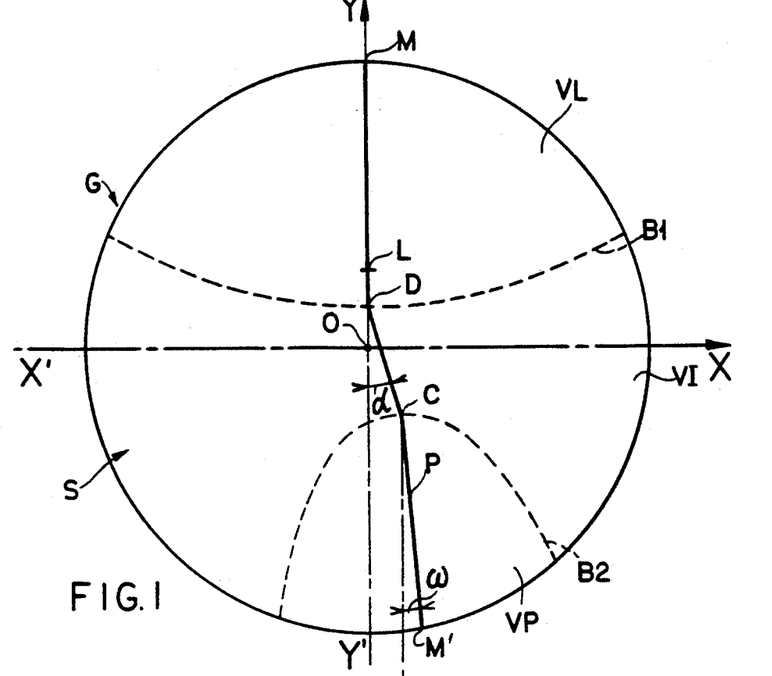
FIG. 1 is a front view showing the aspherical surface of a lens in accordance with the present invention.

The lens G shown in FIG. 1 includes an aspherical surface S which may be concave or convex and which is preferably continuous. In conventional manner, the top portion of the surface S includes a first vision zone VL which may be spherical or aspherical and whose curvature is adapted to far vision, and in its bottom portion it includes a second vision zone VP which may be spherical or aspherical, and whose curvature is adapted to near vision. In conventional manner, there is a third vision zone VI between the zones VL and VP, the curvature of the third zone being adapted to intermediate vision and varying along a main progression meridian curve MM'. In use, said curve MM' extends from the top edge of the lens G to the bottom edge thereof and passes successively through all three vision zones VL, VI, and VP, substantially through the middles thereof. When the surface S is convex, the curvature of the main meridian curve MM' increases from top to bottom along said curve MM' (i.e. its radius of curvature decreases). In contrast, when the surface S is a concave surface, its curvature decreases from top to bottom along said curve MM' (i.e. its radius of curvature increases).

In FIG. 1, the point 0 designates the geometrical center of the aspherical surface S which has a circular outline when seen from in front, L designates the point at which power is measured for far vision, P designates the point at which power is measured for near vision, and D designates the mounting center of the lens. The main meridian curve MM' passes through the three points L, D, and P which are predetermined points of the aspherical surface S. These three points L, D, and P are usually identified by suitable marks made by the lens manufacturer on the aspherical surface of the lens.

At the point L, the aspherical surface S has a first predetermined mean sphere value adapted to far vision, whereas at the point P it has a second predetermined mean sphere value adapted to near vision. As is known, the mean sphere value $S_{mean}$ at an arbitrary point on an aspherical surface of an ophthalmic lens is defined by the following equation:

$$S_{mean} = \frac{(n-1)}{2}\left(\frac{1}{R_1} + \frac{1}{R_2}\right) \quad (1)$$

where n is the refractive index of the glass of the ophthalmic lens, and $R_1$ and $R_2$ are the main radii of curvature of the aspherical surface S at the point under consideration of said surface. The difference between the value of the mean sphere $S_P$ at the point P and the value of the mean sphere $S_L$ at the point L represents the power addition A of the ophthalmic lens. The points L and P are defined by the standard DIN 58208.

In a system of coordinates where the abscissa axis X'X corresponds to the horizontal diameter of the lens G which is circular in shape when seen from in front, and where the ordinate axis Y'Y corresponds to the vertical diameter of said lens, the point L lies in the far vision zone VL on the vertical axis Y'Y at a distance $y_L$ from the geometrical center O of the surface S, which distance is usually equal to +8 mm. The point P is situated in the near vision zone VP. In known lenses, the coordinates $x_P$ and $y_P$ have values that are constant for all of the lenses in the same family of lenses and which are usually respectively equal to +2.5 mm and −14 mm, regardless of the value of the power addition A. In the lens of the present invention, the ordinate $y_P$ of the point P may be constant and equal for example to −14 mm as in known lenses however the abscissa $x_P$ of the point P varies depending on the value of the power addition A, as described below.

Figure 2:
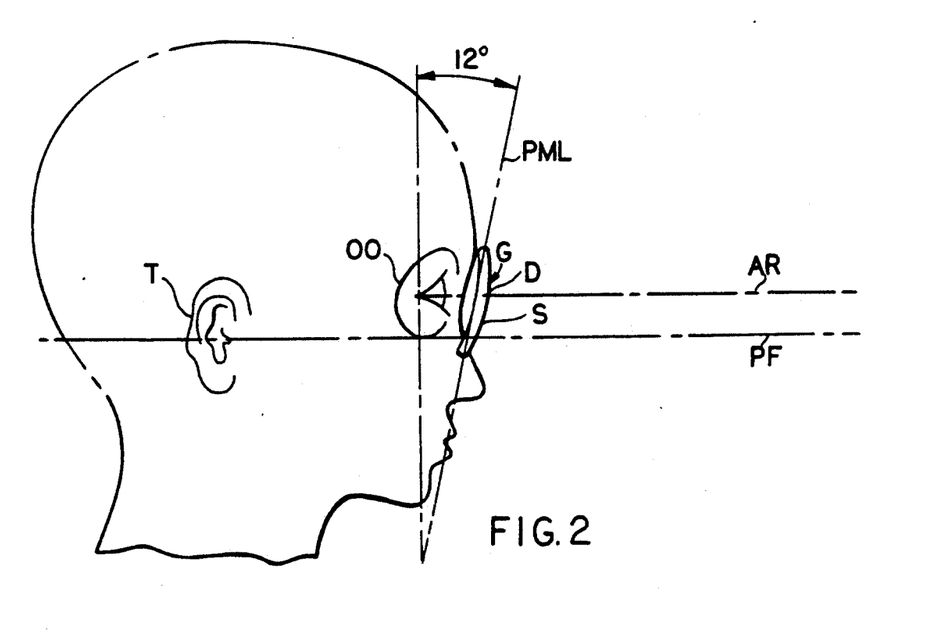
FIG. 2 is a diagram showing how one of the points of the aspherical surface of FIG. 1 is defined.

The mounting center D is defined as shown in FIG. 2. As before, in that FIGURE, G designates the lens with its aspherical surface S, PML designates the mean plane of the lens G which, in use, is at an angle of 12° with the vertical plane containing the line joining the centers of rotation of the eyes of a wearer of glasses, AR designates the line of sight or the axis along which an eye looks, and PF designates the Francfort plane. The plane PF is the plane that includes the tragion T of the ear and the bottom edge of the ocular orbit OO. The mounting center D is defined as being the point of intersection between the line of sight AR and the aspherical surface S when the wearer of the glasses is looking straight ahead to a distant point, the line of sight AR and the Francfort plane PF then both being horizontal. The point D is usually halfway between the points O and L. In other words the ordinate $y_D$ of the point D is usually equal to about +4 mm.

As shown in FIG. 1, the vision zones VL and VI meet at a curve $B_1$, which intersects the main meridian curve MM' at the point D and along which the zones VL and VI merge, preferably in continuous manner. Similarly, the two vision zones VI and VP meet at a second curve $B_2$ which intersects the main meridian curve MM' at a point C (which is defined below) and along which the two zones VI and VP preferably merge in continuous manner. The invention should nevertheless not be limited to the shape and disposition of the curves $B_1$ and $B_2$ as shown in FIG. 1. These two curves $B_1$ and $B_2$ could intersect the main meridian curve MM' at points other than the points D and C.

As also shown in FIG. 1, the main meridian curve MM' includes, in known manner, a first portion MD which extends vertically from the top edge of the lens G to the mounting center D and which, seen from in front, merges with the corresponding portion of the vertical axis Y'Y, and a second portion DP or DM' which extends from the mounting center D obliquely towards the nose side of the lens G (the lens shown in FIG. 1 being a lens intended for the right eye of a wearer of glasses).

According to a feature of the present invention, the second portion DM' of the main meridian curve MM' is itself subdivided into a first segment DC which extends from the mounting center D to a fourth predetermined point C situated above the point P, and a second segment CP or CM' which extends from the fourth point C at least as far as the point P. In all cases, the first segment DC extends overall in a first direction that makes a predetermined angle $\alpha$ with the vertical axis Y'Y, and thus also with the first portion MD of the main meridian curve MM'. The value of the angle $\alpha$ depends on the power addition A and is an increasing function thereof For example, the value of $\alpha$ may be given by the formula:

$$\alpha = f(A) = 1.574A^2 - 3.097A + 12.293 \quad (2)$$

A is expressed in diopters and $\alpha$ in degrees. At the point C, the aspherical surface S has a mean sphere value $S_C$ which may be given by the formula:

$$S_C = S_L + k \cdot A \quad (3)$$

where $S_L$ is the value of the mean sphere of the surface S at the point L, A is the power addition (mean sphere addition) between the points L and P of the surface S, and $k$ is a coefficient whose value lies in the range 0.8 to 0.92. The value of the coefficient $k$ preferably depends on the power addition A and is a decreasing function thereof. For example, the value of the coefficient $k$ may be given by the formula:

$$k = i(A) = -0.00836A^2 + 0.00381A + 0.8977 \quad (4)$$

Relative to the vertical axis Y'Y the second segment CM' preferably makes an angle $\omega$ which has a predetermined value lying in the range 0 and the value of the angle $\alpha$. Although the value of the angle $\omega$ may be constant, it preferably depends on the addition A and is an increasing function thereof. For example, the value of the angle $\omega$ may be given by the formula:

$$\omega = g(A) = 0.266A^2 - 0.473A + 2.967 \quad (5)$$

where A is again expressed in diopters, and $\omega$ is expressed in degrees.

Figure 4:
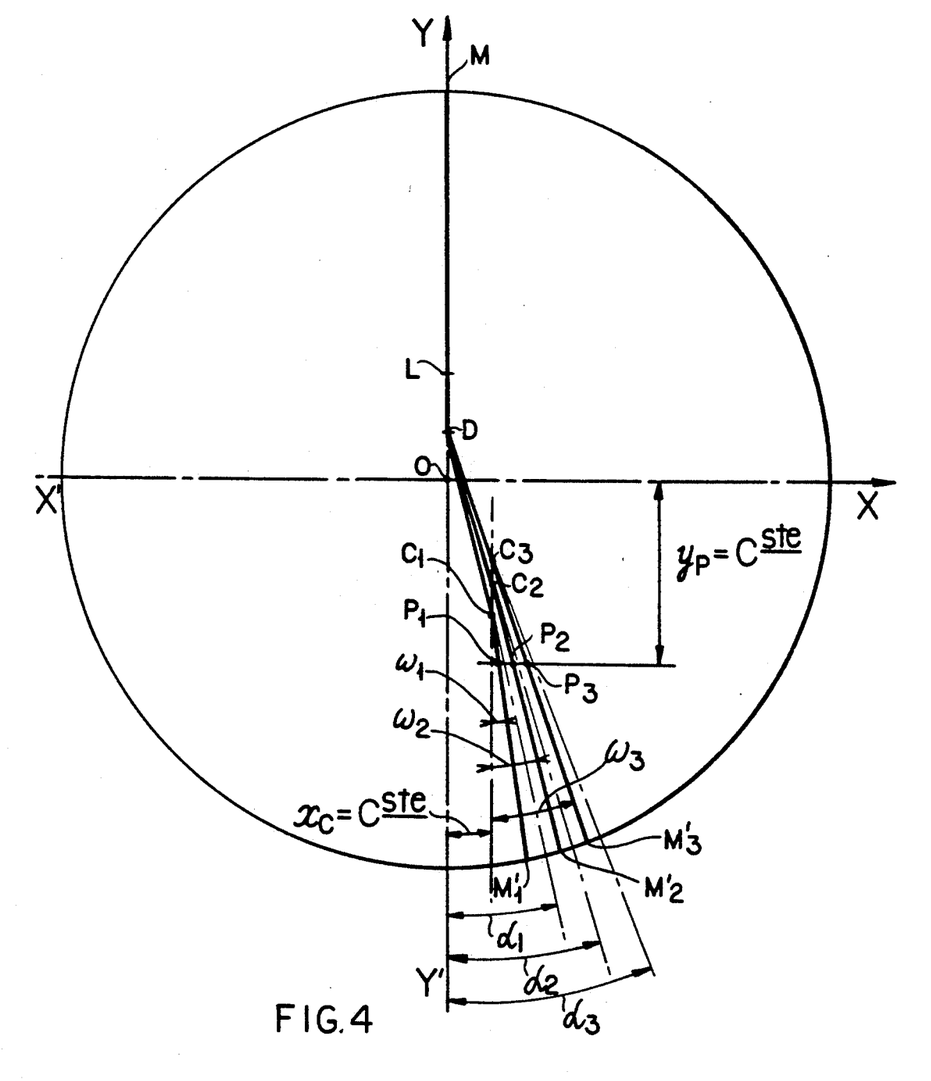
FIG. 4 is a view similar to FIG. 3, showing a variant embodiment, likewise for three values of power addition.

The ordinate $y_C$ of the point C in the X'X, Y'Y coordinate system preferably has a predetermined value that depends on the power addition A and is an increasing function thereof. For example, the value of the ordinate $y_C$ may be given by the formula:

$$y_C = h(A) = 0.340A^2 - 0.425A - 6.422 \quad (6)$$

where A is expressed in diopters and $y_C$ in mm. Although the value of the abscissa $x_C$ of the point C may be constant, i.e. independent of the power addition A (FIG. 4), the abscissa $x_C$ preferably has a value that is also an increasing function of the power addition. For example, the value of the abscissa $x_C$ may be given by the formula:

$$x_C = j(A) = 0.152A^2 - 0.293A + 2.157 \quad (7)$$

where A is expressed in diopters and $x_C$ in mm.

Figure 3:
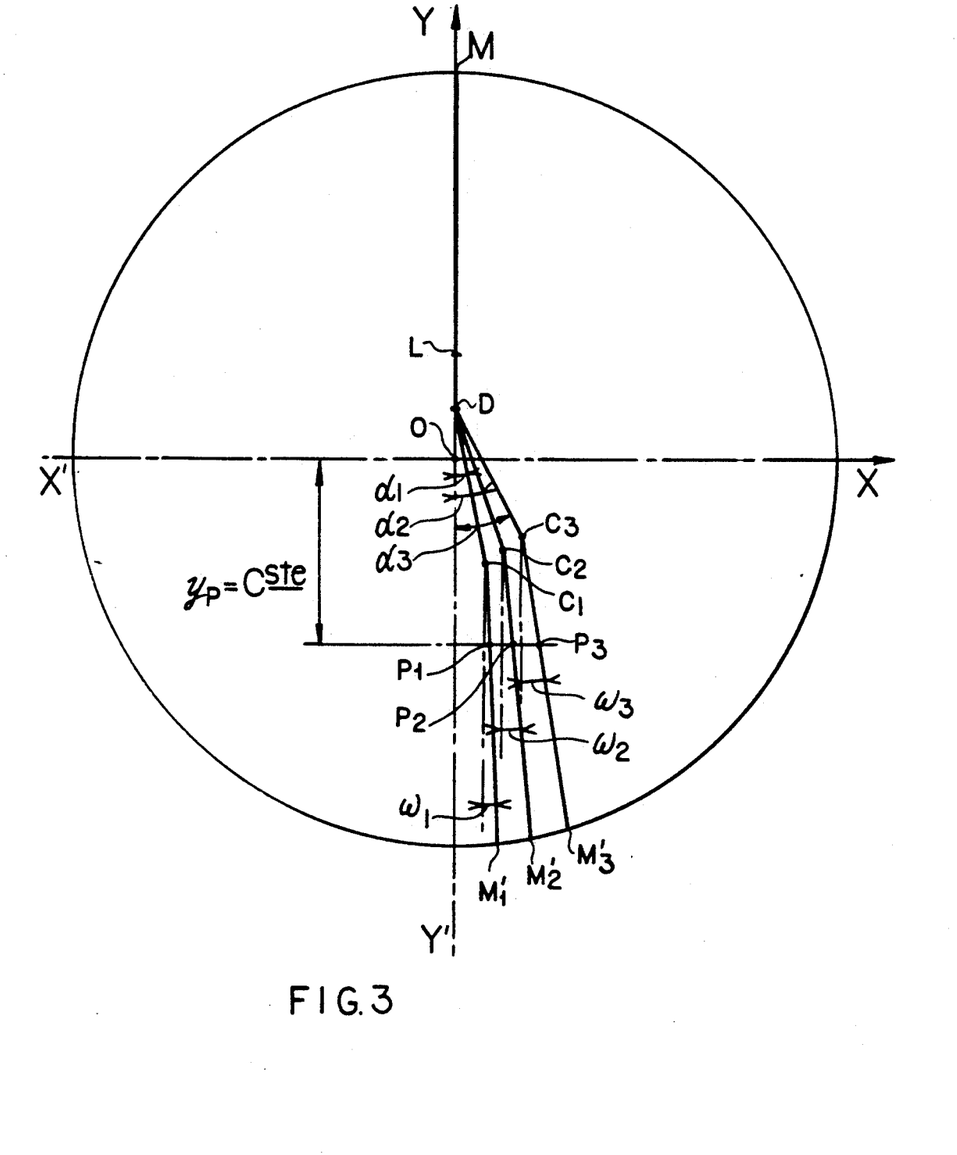
FIG. 3 is a view similar to FIG. 1 and showing, on a larger scale, the shape of the main meridian curve of the aspherical surface for three different values of power addition.

The point P has ordinate $y_P$ whose value is constant (independent of the power addition A) and is equal to $-14$ mm for example, as for known multifocal lenses. The abscissa $x_P$ of the point P has a value that depends on the addition A and is an increasing function thereof. For example, the abscissa $x_P$ is given by the formula:

$$x_P = m(A) = 0.222A^2 - 0.438A + 2.491 \quad (8)$$

where A is again expressed in diopters, and $x_P$ is in mm. FIG. 3 shows the shape of the main meridian curve MM' for three different values of power addition A, e.g. respectively for A=1 diopter, for A=2 diopters, and for A=3 diopters, with $\alpha$, $\omega$, $x_C$, $y_C$ and $x_P$ having values that are increasing functions of the addition A. In FIG. 3, the angles $\alpha$ and $\omega$ of the points C, P, and M' are designated by the corresponding letter plus a subscript "1", or "2", or "3", depending on whether the power addition is equal to 1, or 2, or 3 diopters. In FIG. 3, the sizes of the angles $\alpha$ and $\omega$ do not correspond with reality, but are exaggerated to clarify the drawing (the same remarks apply to FIG. 4 which differs from FIG. 3 essentially by the fact that the abscissa $x_C$ is equal to a constant in FIG. 4). In both cases (FIGS. 3 and 4), it can be seen that the first portion MD of the main meridian curve MM' has a shape that remains unchanged regardless of the value of the addition A.

To define the surface S of the lens of the present invention, one begins by defining the positions of the points L, D, C, and P on the main meridian curve MM', thereby defining the shape of said curve MM'. For example, $x_L = x_D = 0$, $y_L = +8$ mm, $y_D = +4$ mm, and $y_P = -14$ mm as in known lenses, and the values of $\alpha$, $\omega$, $y_C$, $x_C$, and $x_P$ are respectively defined by above-specified formulas (2), (5), (6), (7), and (8).

Once the shape of the main meridian curve MM' has been defined, the variation law or progression law for the curvature of the surface S along said curve MM' is then chosen. Said curve may be an umbilic curve of the surface S, i.e. a curve for which the two main radii of curvature of the surface are equal at every point of the curve. However, to implement the invention, it is not essential for the curve MM' to be an umbilic curve and the two main radii of curvature of the surface S could have different values at each point of the curve. When defining the variation law for the curvature along the main meridian curve MM', it is ensured that the value of the mean sphere $S_C$ at the point C satisfies formula (3), with the value of the coefficient $k$ in said formula lying in the range 0.8 to 0.92. For example, the value of the coefficient $k$ preferably also ensures that the mean sphere gradient is greater over the segment DC than over the segment CP of said curve MM'.

Figure 5:
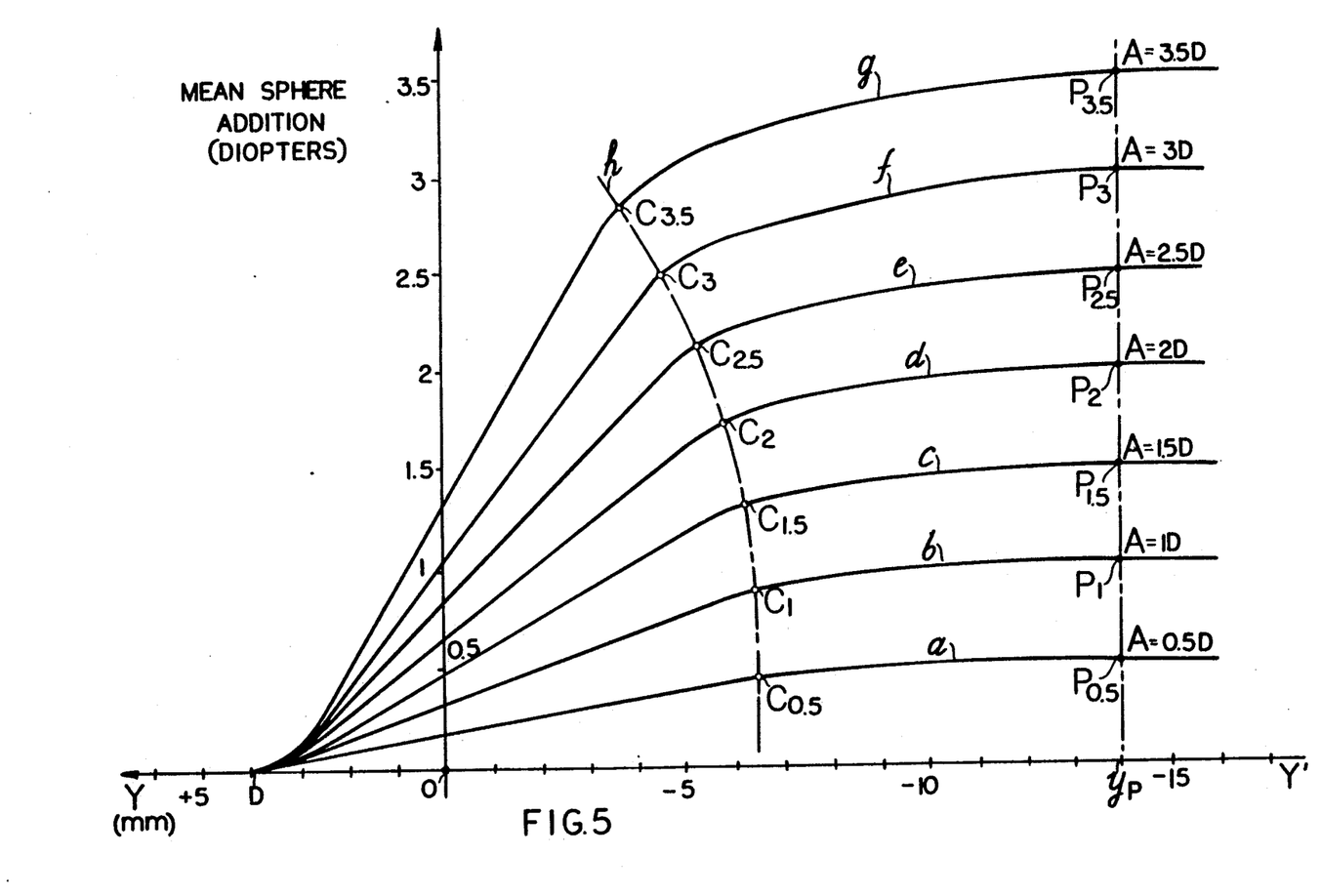
FIG. 5 is a diagram showing how the value of the mean sphere of the aspherical surface varies along the main meridian curve for various values of power addition.

In the graph of FIG. 5, curves $a$ to $g$ show an example of a variation law for the value of the mean sphere along the main meridian curve MM' of a family of lenses of the invention having the following respective nominal addition values: 0.5D, 1D, 1.5D, 2D, 2.5D, 3D, and 3.5D. In the graph of FIG. 5, the ordinate $y$ of the current point along the main meridian curve MM' is plotted along the abscissa and the value of the mean sphere addition at the point under consideration of the curve MM' relative to the value of the mean sphere at the point L is plotted along the ordinate. On curves $a$ to $g$, the points corresponding respectively to the points C and P of the main meridian curve MM' are respectively designated by the corresponding letter C or P plus a subscript corresponding to the value of the nominal addition A of each of the curves $a$ to $g$.

In FIG. 5, it can be seen that for ordinate values y greater than +4 mm, i.e. for the portion MD of the main meridian curve MM', the mean sphere value remains constant or substantially constant and equal to the mean sphere value $S_L$ of the point L, regardless of the value of the addition A. Similarly, for ordinate values $y$ less than $y_P$ (−14 mm), i.e. for the segment PM' of the main meridian curve MM', the mean sphere value remains constant or substantially constant and equal to the mean sphere value $S_L$ at the point L plus the nominal value of the addition A for each lens of the family. For values of $y$ lying between +4 mm and −14 mm, i.e. along the portion DP of the main meridian curve MM', the value of the mean sphere increases from the point D going towards the point P with a gradient that is greater along the segment DC than along the segment CP. It may be observed that the chain-dotted curve $h$ in FIG. 5 is the curve representing the function $y_C = h(A)$, an example of which is given by above-specified formula (6).

In the example of the variation law as shown in FIG. 5, for all values of the addition A, the mean sphere value begins to increase from the point D of the main meridian curve MM', and it ceases to increase beyond the point P of said curve. It is not essential for this always to be true when implementing the present invention. When selecting the variation law for the curvature along the main meridian curve MM', it is possible for the curvature to begin varying (increasing when the surface is convex) from a point other than the point D, that is spaced apart from the point L and whose ordinate $y$ has a value that depends on the value of the addition A, in accordance with the teaching of the Applicants' French patent No. 2 617 989. Similarly, it is also possible to ensure that the curvature or the mean sphere continues to vary (to increase if the surface is convex) beyond the point P to some other point on the portion PM' of the main meridian curve MM', with the ordinate of said other point and the further addition of curvature or of mean sphere at said other point relative to the point P having values that depend on the value of the addition A, as also taught by the Applicants' French patent No. 2 617 989. In this respect, it may be observed that the points L and P of the surface S of the lens of the present invention correspond respectively to points A1 and A2 of the surface S of the lens shown in FIG. 1 of French patent No. 2 617 989.

Once the progression law has been selected as described above, the remainder of the surface S of the lens G can be determined in conventional manner, e.g. as described in the Applicants' French patent No. 2 058 494 and its two certificates of addition Nos. 2 079 663 and 2 193 989.

Thus, with lenses of the present invention, the main meridian curve MM' in the intermediate vision zone VI is segmented into two segments DC and CP, which segmentation changes with the value of the addition A at least with respect to the value of the angle $\alpha$ and preferably also with respect to the value of the ordinate $y_C$ of the point C, and optionally also with respect to the value of the angle $\omega$ and the values of the abscissas $x_C$ and $x_P$ of the points C and P. This segmentation makes it possible to achieve improved binocular vision by complying with the habits and natural posture of people suffering from presbyopia. In addition, the distribution of the power or the mean sphere along the main meridian curve MM', which distribution changes with the value of the nominal addition A and takes account of a predetermined mean sphere value at the point C, (which mean sphere value itself depends on the value of the nominal addition A), makes it possible to put less strain on the remaining subjective accommodation, thereby reducing visual fatigue and achieving greater comfort. In this respect the present invention is based on studies performed on a large number of people, which studies have shown that the preferred elevation of the eyes in the orbit OO (FIG. 2), i.e. the angle between the axis AR and the plane PF, depends on the inclination of the head, i.e. the angle formed between the plane PF and the vertical, and on the viewing distance, i.e. the range to the object being looked at, and that the near viewing distance reduces with the age of the wearer of glasses.

In the above description, the definition of the aspherical surface S of the lens of the invention does not take account of the curvature of the other surface of the lens, which curvature is selected for a given wearer of glasses as a function of the prescription of an ophthalmologist for correcting the ametropia of said wearer, where necessary.

As is well known, the difference between the curvatures of the two surfaces of the lens at the points where said surfaces intersect with any light ray from the eye of the wearer induces a prism or a prismatic effect that has a vertical component and a horizontal component.

The vertical component of the prism induced by the correction of ametropia may be compensated, at least in part, relatively easily either by changing the inclination of the eyes in their orbits, or else by changing the vertical position of the head (changing the inclination of the Francfort plane PF in FIG. 2 relative to the horizontal plane), or else by a combination of the above two changes.

The horizontal component of the prism induced by the correction of ametropia can only be compensated by horizontal eye movements (convergence) which give rise to position differences for the main meridian curve MM'.

Studies performed by the inventor have shown that up to a value of 1.5 diopters for the addition A, it may be assumed that the profile of the main meridian curves MM' varies little with ametropia and the way in which prism compensation is performed (by moving the head or by moving the eyes or by moving both the head and the eyes simultaneously). For additions of more than 1.5 diopters, only the position of the point C appears to depend on the way in which the vertical prism component is compensated, particularly with hypermetropia and large additions. Furthermore, it may be assumed that the profile of the main meridian curve does not change in the zone VP regardless of the ametropia and of the way in which prism compensation is performed.

The differences in the positions of the main meridian curves MM' depend very little on the strategy used for compensating the vertical component of the prism, since they depend essentially on the horizontal component of said prism. For each value of the addition A, and thus for each lens in the family of lenses, one solution for reducing the differences of the positions of the main meridian curves for the various values of lens power in the far vision zone VL consists in minimizing the value of the horizontal component of the prism along the main meridian curve MM'. This may be done in conventional manner. Furthermore, if this solution is insufficient or impossible to perform, in particular for high values of addition and for high values of far vision power, studies performed by the inventor have shown that the lens G can be rotated as a whole about its mounting center D to compensate for the horizontal component of the prism induced by the correction of ametropia. This amounts to rotating the portion DC of the main meridian curve MM' through an angle $\alpha'$ positively or negatively relative to the angle $\alpha$ mentioned above in the description.

Figure 6:
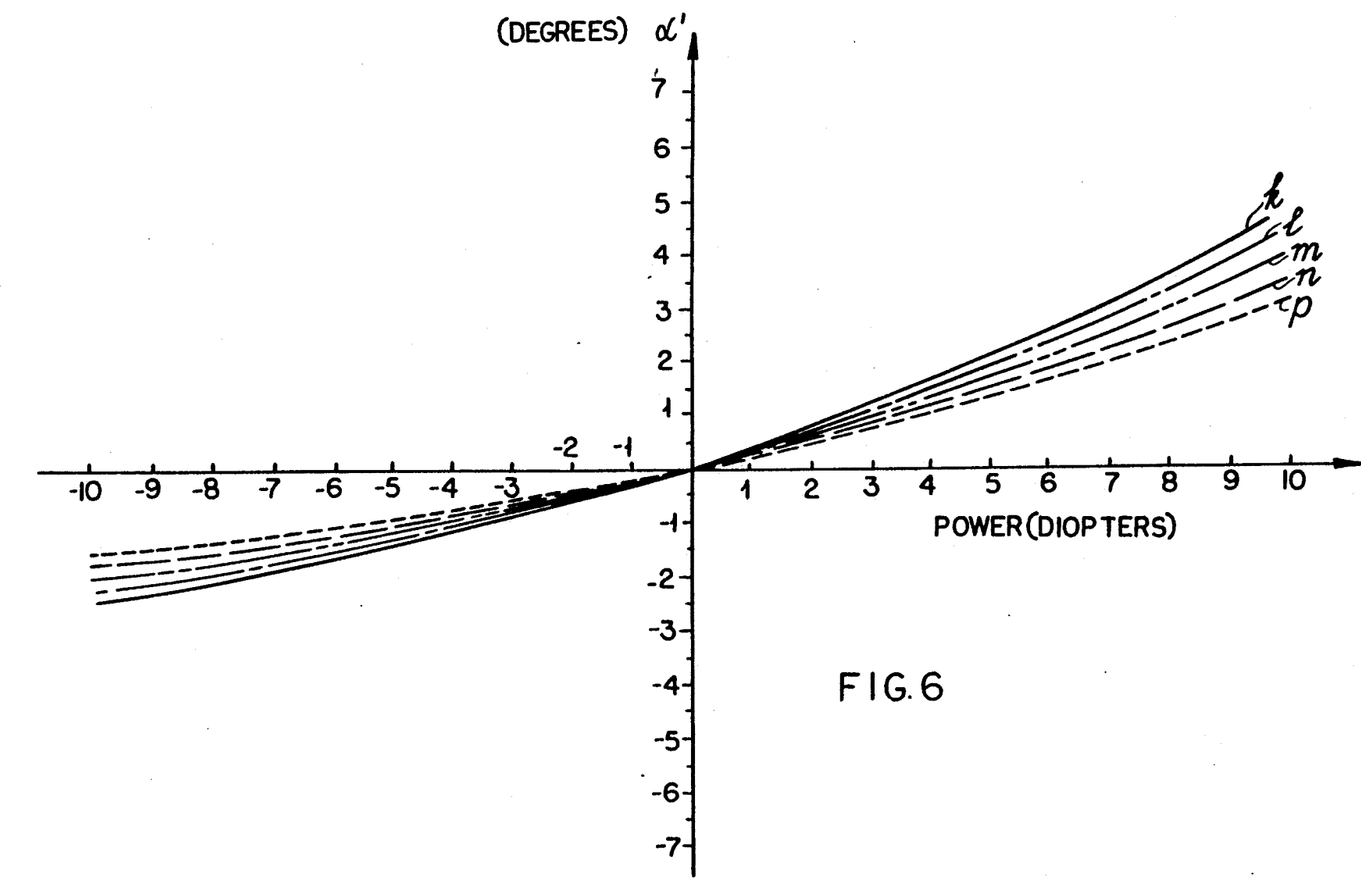
FIG. 6 is a graph showing the correction α' to be added or subtracted to the angle α of FIG. 1 as a function of the value of the addition A and of the ametropia of the wearer of the glasses.

For various values of the addition A, FIG. 6 shows how the angle $\alpha'$ (expressed in degrees) varies as a function of the power (expressed in diopters) of the lens for far vision. Curves $k$, $l$, $m$, $n$, and $p$ correspond respectively to values for the addition A of 3.00D, 2.75D, 2.5D, 2.00D, and 0.75D. Abovementioned curves $k$ to $p$ are plotted for the case where the distance between the lens and the center of rotation of the eye is 27 mm and for the case where the inclination of the spectacle frame is 12° (FIG. 2).

From the above, in order to compensate the horizontal component of the prism induced by the correction of ametropia, the angle $\alpha$ of the lens in the family of lenses of the invention can be determined by the following formula:

$$\alpha = f(A) + \alpha' \quad (9)$$

where:

$$\alpha' = a \cdot P_{VL} + b \cdot (P_{VL})^2 \quad (10)$$

in which $\alpha$, $f(A)$, and $\alpha'$ have the meanings given above, $P_{VL}$ is the power of the lens in far vision, and $a$ and $b$ are coefficients whose values depend on the value of the addition A. As shown in FIG. 6, curves $k$ to $p$ are parabolic in appearance which explains why the angle $\alpha'$ can be expressed as a second degree function of $P_{VL}$, as shown by equation 10. The coefficients $a$ and $b$ may be determined from the curves $k$ to $p$. As already mentioned, their values are a function of the value of the addition A, and may, in general terms, be defined by the following relationships:

$$0.2 < a < 0.4 \quad (10)$$

$$6 \times 10^{-3} < b < 1.2 \times 10^{-2} \quad (12)$$

Naturally the embodiment of the invention as described above is given purely by way of non-limiting example and numerous modifications may be applied thereto by the person skilled in the art without thereby going beyond the ambit of the present invention.

I claim:

1. A multifocal ophthalmic lens comprising an aspherical surface having a first vision zone for far vision, a second vision zone for near vision, and between said first and second zones, a third vision zone for intermediate vision with the curvature thereof varying progressively along a main meridian curve of power progression that extends from the top edge to the bottom edge of the lens and that passes successively through all three vision zones of the aspherical surface, passing through three predetermined points thereof, namely a first point situated in the first vision zone and called the far vision power measurement point where the aspherical surface has a first predetermined mean sphere value, a second point called the mounting center and situated between the first point and the geometrical center of the aspherical surface, and a third point situated in the second vision zone and called the near vision power measurement point where the aspherical surface has a second predetermined mean sphere value, the difference between the first and second mean sphere values being equal to the power addition A of the lens, the main meridian curve having a shape that depends on the value of the power addition and that in a front view of the aspherical surface includes a first portion extending vertically from the top edge of the lens to the second point, and a second portion extending obliquely from the second point towards the nose side of the lens, wherein the second portion of the main meridian curve includes a first segment which extends from the mounting center to a fourth point situated above the third point generally in a first direction at a first angle $\alpha$ of predetermined value relative to the vertical first portion of the main meridian curve, which predetermined value depends on the power addition A in accordance with an increasing function $\alpha = f(A)$, and a second segment which extends from the fourth point to the third point generally in a second direction at a second angle $\omega$ relative to the vertical first portion of the main meridian curve, the second angle $\omega$ having a predetermined value such that $0 < \omega < \alpha$, and wherein the aspherical surface has a predetermined mean sphere value $S_C$ at the fourth point which is equal to:

$$S_C = S_L + k \cdot A$$

where $S_L$ is said first predetermined mean sphere value at the first point, A is the power addition, and $k$ is a coefficient such that:

$$0.8 < k < 0.92.$$

2. A lens according to claim 1, wherein said increasing function $f(A)$ is given by the formula:

$$\alpha = f(A) = 1.574 A^2 - 3.097 A + 12.293$$

where A is expressed in diopters, and $\alpha$ in degrees.

3. A lens according to claim 1, wherein the predetermined value of the second angle $\omega$ depends on the power addition A, in accordance with an increasing function $g(A)$.

4. A lens according to claim 3, wherein the said increasing function $g(A)$ is given by the formula:

$$\omega = g(A) = 0.266 A^2 - 0.473 A + 2.967$$

where A is expressed in diopters, and $\omega$ in degrees.

5. A lens according to claim 1, wherein the coefficient $k$ has a value that depends on the power addition A, in accordance with a decreasing function i(A).

6. A lens according to claim 5, wherein said decreasing function i(A) is given by the formula:

$$k = i(A) = -0.00836A^2 + 0.00381A + 0.8977$$

where A is expressed in diopters.

7. A lens according to claim 1, wherein the gradient of the mean sphere of the aspherical surface is greater over the first segment than over the second segment of the main meridian curve.

8. A lens according to claim 1, wherein in a system of coordinates where the abscissa axis corresponds to the horizontal diameter of the lens that is circular in shape when seen from in front, and where the ordinate axis corresponds to the vertical diameter of said lens, the ordinate of said fourth point has a predetermined value that depends on the power addition A, in compliance with an increasing function h(A).

9. A lens according to claim 8, wherein said increasing function h(A) is given by the formula:

$$y_C = f(A) = 0.340A^2 - 0.425A - 6.422$$

where A is expressed in diopters, and $y_C$ in mm.

10. A lens according to claim 8, wherein the abscissa $x_C$ of the fourth point has a value that depends on the power addition A in compliance with an increasing function j(A).

11. A lens according to claim 10, wherein said increasing function j(A) is given by the formula:

$$x_C = j(A) = 0.152A^2 - 0.293A + 2.157$$

where A is expressed in diopters, and $x_C$ in mm.

12. A lens according to claim 1, wherein the abscissa $x_P$ of the first point has a value that depends on the power addition A, in compliance with an increasing function m(A).

13. A lens according to claim 12, wherein said increasing function m(A) is given by the formula:

$$x_P = m(A) = 0.222A^2 - 0.438A + 2.491$$

where A is expressed in diopters, and $x_P$ in mm.

14. A lens according to claim 1, wherein the first angle $\alpha$ is given by the formula:

$$\alpha = f(A) + \alpha'$$

where:

$$\alpha = a \cdot P_{VL} + b \cdot (P_{VL})^2$$

in which A is expressed in diopters, $\alpha$ and $\alpha'$ are expressed in degrees, $P_{VL}$ is the power of the lens for far vision, expressed in diopters, and $a$ and $b$ are coefficients whose values depend on the value of the addition A.

15. A lens according to claim 14, wherein the coefficient a and b satisfy the relationships:

$$0.2 < a < 0.4$$
$$6 \times 10^{-3} < b < 1.2 \times 10^{-2}.$$

* * * * *